United States Patent [19]

Marsden et al.

[11] Patent Number: 4,736,811
[45] Date of Patent: Apr. 12, 1988

[54] STEERING CONTROL SYSTEM

[75] Inventors: Howard A. Marsden, Pekin; Dwight S. Holloway, Chillicothe; Noel J. Rytter, Peoria, all of Ill.

[73] Assignee: Caterpillar Inc., Peoria, Ill.

[21] Appl. No.: 52,946

[22] Filed: May 22, 1987

[51] Int. Cl.$^4$ .............................................. B62D 5/08
[52] U.S. Cl. ..................................... 180/133; 60/405; 91/6
[58] Field of Search ...................... 180/133, 142; 91/6; 60/405, 403

[56] References Cited

U.S. PATENT DOCUMENTS 4,513,835 4/1985 Fudino et al. ...................... 180/142
4,651,841 3/1987 Adams ............................. 180/133 X Primary Examiner—John A. Pekar
Attorney, Agent, or Firm—John W. Grant

[57] ABSTRACT

The steering system of some lightweight vehicles are electronically controlled and have a manually operated mechanical control as a backup. Such manual backup control would not be adequate for large earthmoving, construction and industrial type vehicles. The subject steering system includes an electrically controlled circuit actuated by rotation of a steering wheel for controlling a main pilot operated steering valve as the primary steering control. A hydraulic control circuit is also actuated by rotation of the steering wheel for controlling the same steering valve as a backup control when the electrically controlled circuit is not active. The hydraulic steering circuit is disabled when the electrically controlled circuit is activated. By using the same steering valve as an integral part of both circuits, the complexity and cost of the overall steering control system is reduced.

10 Claims, 2 Drawing Sheets

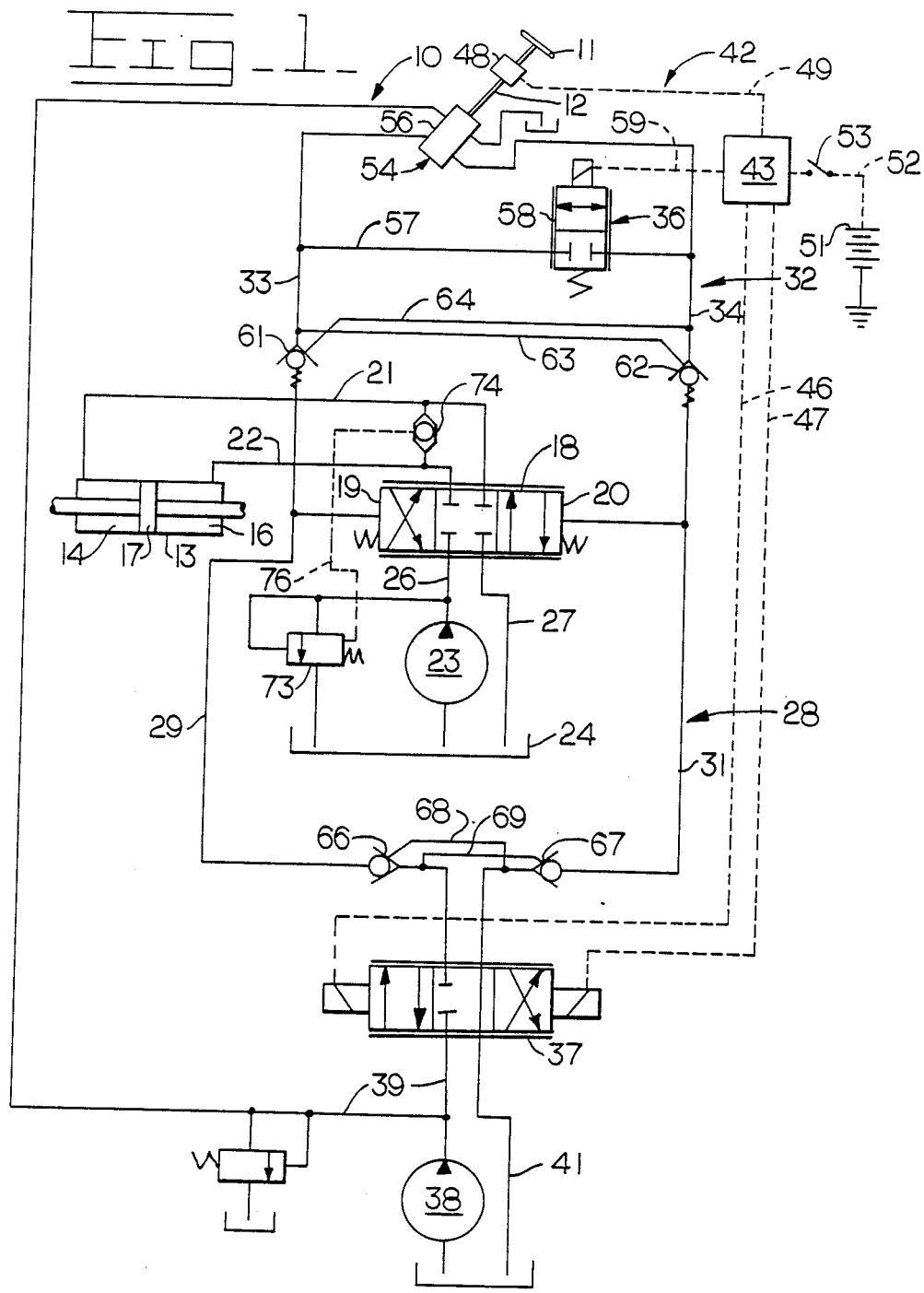

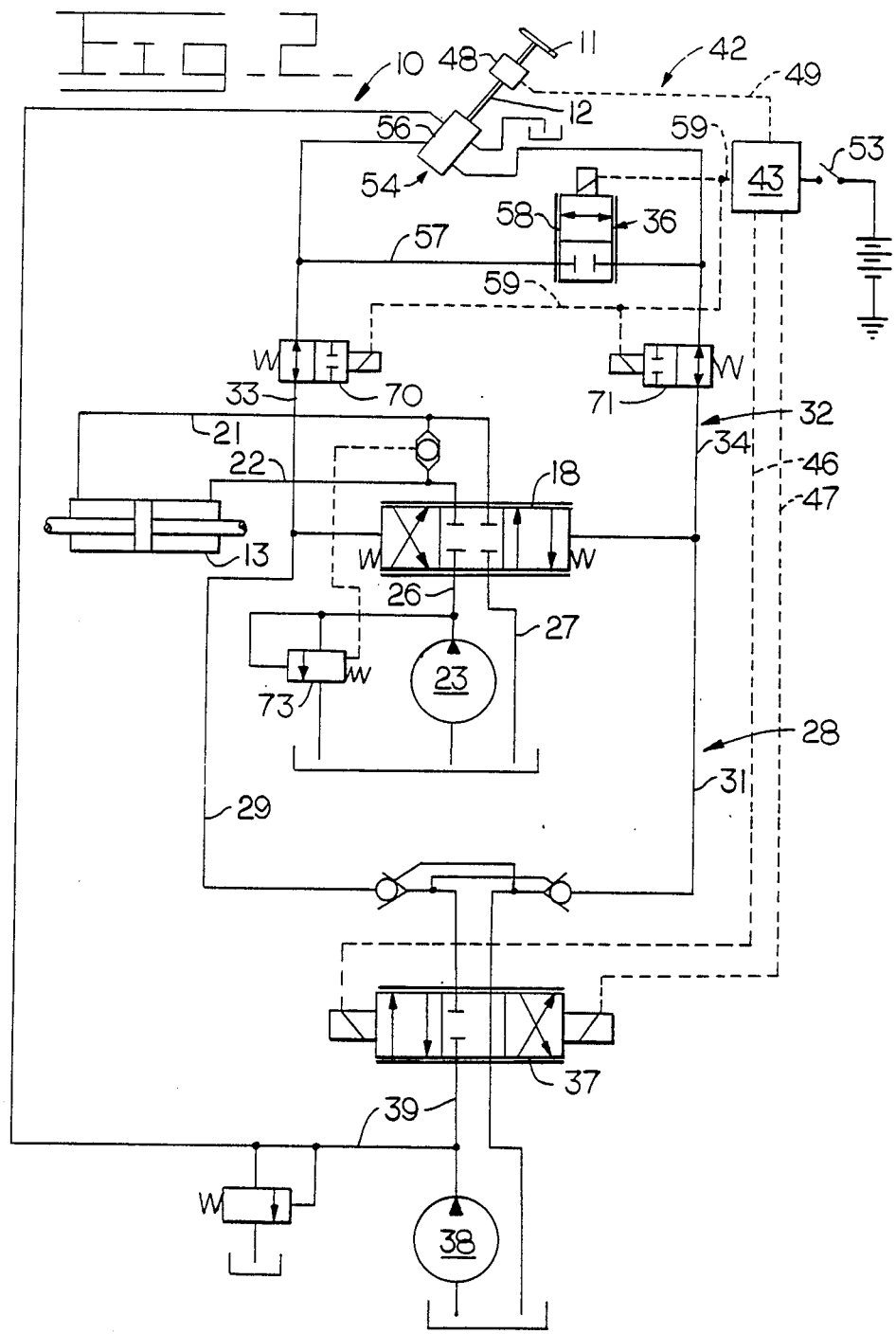

STEERING CONTROL SYSTEM

DESCRIPTION

1. Technical Field

This invention relates generally to a steering control system for a vehicle and more particularly to a system using electronics as the primary control and hydraulics as a backup control.

2. Background Art

Electronic steering controls are currently being developed for vehicle steering systems because of their potential versatility over mechanical and hydraulic steering systems. Such electronic systems still commonly use hydraulic power as the muscle for the actual steering function and electrical components as the command for the precision control of the hydraulic components.

One such steering control apparatus is disclosed in U.S. Pat. No. 4,513,835 issued to Fukino et al. on Apr. 30, 1985. The steering control therein has a sensor which senses rotation of a shaft connected to the steering wheel and directs an electrical signal to an electrical control box with the strength of the signal being commensurate with the rotational speed of the shaft. The electrical control box, in turn, directs a signal proportional to the rotational speed of the shaft to a coil of a solenoid directional valve which directs pressurized hydraulic fluid to the steering control actuator. The steering wheel shaft is also connected to a pinion of a rack and pinion steering gear assembly. The toothed rack of the steering gear assembly is mechanically connected to the rod of the hydraulic steering actuator. Thus, if one of the electrical components fails, the driver can still steer the vehicle through the interaction of the rack and pinion steering gear assembly in an emergency situation.

While the above-noted steering system is suitable for automobiles and light duty trucks, it would not be suitable for use on large earthmoving, construction, or industrial type vehicles where the steering function is normally accomplished through hydraulic power. In most cases, the machine operator could not feasibly steer such vehicle by manual effort alone due to the massive size and/or steering geometry. Since there is considerable reluctance by the customers to purchase a vehicle in which steering is dependent solely upon electronics, the problem then became one of how to incorporate electronic and hydraulic steering in one integral system so that the primary steering is done electronically with the hydraulic steering capability always available as a backup to electronic steering.

The present invention is directed to overcoming one or more of the problems as set forth above.

DISCLOSURE OF THE INVENTION

In one aspect of the present invention, a steering control system for a vehicle has a steering wheel connected to a rotatable shaft, a hydraulic steering actuator, a hydraulic pump, and a pilot operated steering valve connected between the pump and the hydraulic steering actuator with the steering valve having opposite ends. An electronically controlled steering circuit is connected to the opposite ends of the steering valve and includes a source of pressurized pilot fluid, a solenoid operated valve connected to the source of fluid, a pair of pilot lines connecting the solenoid operated pilot valve with the opposite ends of the steering valve, and means for sensing the rotational velocity of the shaft and directing an appropriate electrical signal to the solenoid valve. A hydraulic steering circuit is connected to the opposite ends of the steering valve and includes means for generating a hydraulic fluid signal in response to rotation of the steering shaft. A means is provided for disabling the hydraulic circuit when the electrical controlled steering circuit is active.

The steering control system of the present invention has an electrically controlled circuit as the primary control of a main steering control valve and a hydraulic circuit as a backup control of the same main steering control valve. The hydraulic circuit is disabled when the electronically controlled circuit is active. However, the hydraulic circuit is disabled in a manner that the hydraulic signal generating means remains operational even when the electrically controlled circuit is active so that the hydraulic circuit is always available on demand when needed.

BRIEF DESCRIPTION OF THE DRAWINGS

FIG. 1 is a schematic view of an embodiment of the present invention; and

FIG. 2 is a schematic view of another embodiment of the present invention.

BEST MODE FOR CARRYING OUT THE INVENTION

A steering control system 10 includes a steering wheel 11, a rotatable shaft 12 connected to the steering wheel, and a hydraulic actuator 13 having fluid chambers 14,16 at opposite sides of a piston 17. A pilot operated main steering valve 18 has opposite ends 19,20 and is connected to the fluid chambers 14,16 through motor conduits 21,22. A hydraulic pump 23 and a tank 24 are suitably connected to the steering valve 1b through a supply conduit 26 and a tank conduit 27. The steering valve 18 is spring biased to a neutral position shown at which communication to and from the fluid chambers 14,16 is blocked. The steering valve 18 is movable to the right to a position at which pressurized fluid from the pump 23 is directed through the motor conduit 21 to the fluid chamber 14 for moving the piston 17 to the right for steering in a first direction. Similarly, moving the steering valve 18 leftwardly directs pressurized fluid through the motor conduit 22 to the chamber 16 causing the piston 17 to move leftwardly for steering in the opposite direction.

The steering control system 10 also includes an electrically controlled circuit 28 connected to the opposite ends 19,20 of the steering valve 1B through a pair of pilot lines 29,31, a hydraulic circuit 32 also connected to the opposite ends of the steering valve through a pair of pilot lines 33,34, and a means 36 for disabling the hydraulic circuit 32 when the electrically controlled circuit 28 is active.

The electrically controlled circuit 28 includes a solenoid actuated proportional pilot valve 37 connected to the conduits 29,31, a source of pressurized pilot fluid such as a pilot pump 38 connected to the pilot valve through a supply line 39, and a drain line 41 connecting the pilot valve 37 to the tank 24. With the pilot valve 37 in the neutral position shown, the supply line 39 is blocked while the conduits 29,31 are connected to drain line 41. The pilot valve is movable rightwardly to a first position at which the pilot supply line 39 communicates with the pilot line 29 and the pilot line 28 communicates with the drain line 41. The pilot valve is also movable leftwardly to a second position at which the supply line 39 communicates with the pilot line 31 and the pilot line 29 communicates with the drain line 41.

The electrically controlled circuit 28 also includes a means 42 for sensing rotation and the direction of rotation of the shaft 12 and for directing an appropriate electrical signal to the solenoid actuated pilot valve 37. The means 42 includes a electronic control box 43 connected to the solenoids of the pilot valve 37 through a pair of electrical lines 46,47. A steering velocity sensor 48 is suitably mounted relative to the shaft 12 to be actuated by rotation thereof and is connected to the control box 43 through an electrical line 49. A source of electrical energy such as a battery 51 is connected to the control box 43 through an electrical line 52 and a manually operable switch 53 disposed in the electrical line 52.

The hydraulic circuit 32 includes a means 54 for generating a hydraulic fluid signal in response to rotation of the shaft 12. The signal generating means 54 includes a steering control valve commonly referred to as a hand metering unit 56 connected to the pilot fluid supply line 39 and to the conduits 33,34. The hand metering unit 56 is mechanically coupled to the shaft 12 and is of the conventional type to direct a pressurized fluid signal through the appropriate pilot line 33 or 34 with the pressure of the signal and the volume of fluid being commensurate with the rotational speed of the shaft 12.

The disabling means 36 includes a shunt line 57 interconnecting the pilot lines 33,34 and a solenoid actuated shunt valve 58 disposed in the shunt line 57. The shunt valve 58 is spring biased to the blocking position shown for blocking fluid flow through the shunt line 57. The shunt valve is movable to an operative position permitting fluid flow through the shunt line 58 and thereby controllably isolates the hand metering unit 56 from the steering valve 18. An electrical line 59 connects the control box 43 to the shunt valve 57.

A pilot operated check valve 61 is disposed in the conduit 33 while another pilot operated check valve 62 is disposed in the pilot line 34. A pilot line 63 connects the conduit 34 to the pilot operated check valve 61, and a pilot line 64 connects the pilot line 33 to the pilot operated check valve 62. Similary, a pair of pilot operated check valves 66,67 are individually disposed in the pilot lines 29,31. A pilot line 68 connects the pilot line 31 to the pilot operated check valve 66 and a pilot line 69 connects the pilot line 29 to the pilot operated check valve 67.

An alternate embodiment of the steering control system 10 of the present invention is disclosed in FIG. 2. It is noted that the same reference numerals of the first embodiment are used to designate similarly constructed counterpart elements of this embodiment. In this embodiment, however, a pair of two position solenoid actuated valves 70,71 are disposed in the lines 33,34, respectively, in place of the pilot operated check valves 61,62 disclosed in the embodiment of FIG. 1. The electrical line 59 is commonly connected to both of the valves 70,71. Both of the valves 70,71 are spring biased to the position shown at which fluid can freely communicate through the respective pilot lines 33,34. The valves are movable to a blocking position for blocking communication through the respective line.

In both embodiments, a pressure compensated unloading valve 73 is connected to the supply conduit 26. A resolver valve 74 is connected between the motor conduits 21 & 22 to direct the higher load pressure therein through a load signal line 76 to the spring end of the unloading valve 73. The unloading valve 73 functions in the conventional manner to maintain a minimum standby pressure in the conduit 26 when the valve 18 is in the neutral position shown and maintains a predetermined pressure differential across the valve 18 when the valve 18 is at an operational position.

INDUSTRIAL APPLICABILITY

In the use of the embodiment of FIG. 1, the vehicle driver activates the electrically controlled circuit 28 by manually closing the switch 53 to connect the control box 43 to the battery 51. This immediately sends an electrical signal to energize the shunt valve 58 causing it to move to the fully open operating position to permit fluid to pass through the shunt line 57 between the pilot lines 33,34. Moving the shunt valve 58 to the operating position effectively disables the hydraulic circuit 32 since pressurized fluid delivered from the hand metering unit 56 into one of the pilot lines 33 or 34 in response to rotation of the steering wheel 11 and shaft 12 is directed through the shunt line 57 to the other conduit where it passes through the hand metering unit back to the tank.

With the electrically controlled circuit 28 activated, steering in a first direction is initiated by the driver rotating the steering wheel 11 and shaft 12 in a first direction. The sensor 48 detects the angular velocity of the shaft 12 and directs an electrical signal through the line 44 to the control box 43 with the strength of the signal representative of the detected rotational velocity. The control box 43, in turn, directs an electrical signal commensurate with the strength of the input signal from the sensor through the line 46, for example, to energize the solenoid actuated pilot valve 37 causing it to move rightwardly. Moving the pilot valve 37 to the right directs an appropriate hydraulic signal through the pilot line 29 to the end 19 of the steering valve 18 with the fluid pressure being proportional to the strength of the electrical signal directed to the pilot valve 37. The pressurized fluid signal moves the steering valve 18 to the right an appropriate amount to direct fluid through the motor conduit 21 and into chamber 14 causing the piston 17 to move to the right. The hydraulic pressure in the pilot line 29 passes through the line 69 to unseat the check valve 67 allowing the fluid exhausted from the right end 20 of the steering valve 18 to pass through the pilot line 31, check valve 67, and pilot valve 37 to the tank. The check valve 61 prevents the fluid pressure in the pilot line 29 from communicating with the pilot line 33. Rotating the steering wheel 11 in the opposite direction results in the pilot valve 37 and the steering valve 38 being moved leftwardly to direct hydraulic fluid to the fluid chamber 16 to move the piston leftwardly similarly to that described above.

The strength of the electrical signal through the line 49 is also used to control the operational position of the shunt valve 58 to provide steering wheel "feel" to the steering operation. As the strength of the electrical signal generated by the sensor 48 increases in response to an increase in the rotational velocity of the steering wheel 11 and the shaft 12, the control box 44 proportionally decreases the strength of electrical signal being directed to the shunt valve 58. This causes the shunt valve to proportionally restrict fluid flow therethrough, thereby adding resistance to the rotation of the hand metering unit 56 and hence to the rotation of the steering wheel 11.

Should it become necessary for the driver to utilize the hydraulic circuit 32 for steering the vehicle, he can manually open the electrical switch 53 to interrupt electrical power to the control box. In so doing, the shunt valve 58 is spring biased to the blocking position shown to isolate the pilot line 33 from the pilot line 34. At this time, rotating the steering wheel 11 in the first direction directs a fluid signal through the pilot line 33 and check valve 61 to the end 19 of the steering valve 18. This moves the valve 18 to the right to direct pressurized fluid through the motor conduit 21 to the chamber 14 to move the piston 17 rightwardly. The pressurized fluid in the pilot line 33 passes through the line 64 to unseat the check valve 62 to permit the fluid exhausted from the end 20 of the steering valve to pass through the line 34 to the hand metering unit 56 and to the tank 24.

Rotating the steering wheel 11 in the opposite direction results in a pressurized fluid signal being directed through the pilot line 34 to move the steering valve 18 leftwardly for directing pressurized fluid to the fluid chamber 16 for moving the piston leftwardly in a manner similar to that described above.

The operation of the embodiment of FIG. 2 is essentially the same as that of FIG. 1 with the exception that closing the switch 53 to energize the electrically controlled system 28 moves the valves 70,71 to a blocking position simultaneously with the shunt valve being moved to the open position. The coaction of the shunt valve 58 and the valves 70,71 effectively disable the hydraulic circuit 32 when the electrically controlled circuit 28 is active. Moving the switch 53 to the open position to deactivate the electrically controlled circuit 28 causes the shunt valve 58 to move to the blocking position and the valves 70,71 to move to the open position. The hydraulic circuit 32 then becomes active for controlling the steering valve 1.

In view of the foregoing description, it is readily apparent that the present invention provides an improved steering control system which effectively combines an electrically controlled circuit as the primary steering control and a hydraulic control circuit as a backup steering control. The hydraulic control circuit is disabled when the electrically controlled circuit is active but remains operational for immediate use by the driver. Both the electrically controlled circuit and the hydraulic control circuit control the operation of the same main steering valve for the steering function to thereby simplify the steering control system.

Other aspects, objects, and advantages of this invention can be obtained from a study of the drawings, the disclosure, and the appended claims.

We claim:

1. A steering control system for a vehicle having a steering wheel connected to a rotatable shaft, a hydraulic steering actuator, a hydraulic pump, and a pilot operated steering valve connected between the pump and the actuator, said steering valve having opposite ends, said system comprising:

an electrically controlled circuit connected to the opposite ends of the steering valve and including a source of pressurized pilot fluid, a solenoid operated pilot valve connected to the source of fluid, a pair of pilot lines connected to the pilot valve and the opposite ends of the steering valve, and means for sensing the rotational velocity of the shaft and directing an appropriate electrical signal to the pilot valve;

a hydraulic control circuit connected to the opposite ends of the steering valve and including means for generating a hydraulic fluid signal in response to rotation of the shaft; and means for disabling the hydraulic control circuit when the electrically controlled circuit is activated.

2. The steering control system of claim 1 wherein said generating means includes a hand metering unit connected to the shaft, and said hydraulic control circuit includes a pair of pilot lines connected to the opposite ends of the steering valve.

3. The steering control system of claim 2 wherein said disabling means includes a shunt line interconnecting the pair of pilot lines of the hydraulic control circuit and a shunt valve disposed in said shunt line.

4. The steering control system of claim 3 wherein said disabling means includes a pilot operated check valve disposed in each of the pair of pilot lines of the hydraulic control circuit.

5. The steering control system of claim 4 including a pilot operated check valve disposed in each of the pilot lines of the electrically controlled circuit.

6. The steering control system of claim 3 wherein the disabling means includes a two position valve disposed in each of the pilot lines of the hydraulic control circuit.

7. The steering control system of claim 3 wherein said shunt valve is a solenoid actuated valve movable from a closed position to an operational position in response to an electrical signal directed thereto and including means for decreasing the strength of the electrical signal in proportion to an increase in the rotational velocity of the shaft.

8. A steering control system for a vehicle having a steering wheel connected to a rotatable shaft, a hydraulic steering actuator, a hydraulic pump, and a pilot operated steering valve connected between the pump and the hydraulic steering actuator, said steering valve having opposite ends, said system comprising:

a pilot pump;

a solenoid operated pilot valve connected between the pilot pump and the opposite ends of the steering valve;

means for sensing the rotational velocity of the shaft and directing an appropriate electrical signal to the pilot valve;

a hand metering unit mechanically connected to the shaft for rotation thereby and hydraulically connected to the opposite ends of the steering valve; and means for controllably isolating the hand metering unit from the steering valve.

9. The steering control system of claim 8 including a pair of pilot lines connecting the hand metering unit to the opposite ends of the steering valve, said isolating means includes a shunt line interconnecting the pilot lines and a shunt valve disposed in the shunt line.

10. The steering control system of claim 9 wherein said shunt valve is a solenoid actuated valve movable from a closed position to an operational position in response to an electrical signal directed thereto and including means for decreasing the strength of the electrical signal in proportion to an increase in the rotational velocity of the shaft.

* * * * *